(No Model.) 4 Sheets—Sheet 1.
G. W. MORRIS.
BAND CUTTER AND AUTOMATIC FEEDER FOR THRASHING MACHINES.
No. 495,101. Patented Apr. 11, 1893.

(No Model.)  4 Sheets—Sheet 2.

G. W. MORRIS.
BAND CUTTER AND AUTOMATIC FEEDER FOR THRASHING MACHINES.

No. 495,101. Patented Apr. 11, 1893.

Witnesses
J. Edw. Maybee
W. J. McMillan

Inventor
Geo. W. Morris
by Donald C. Ridout & Co.
Attys (No Model.) 4 Sheets—Sheet 4.
G. W. MORRIS.
BAND CUTTER AND AUTOMATIC FEEDER FOR THRASHING MACHINES
No. 495,101. Patented Apr. 11, 1893.
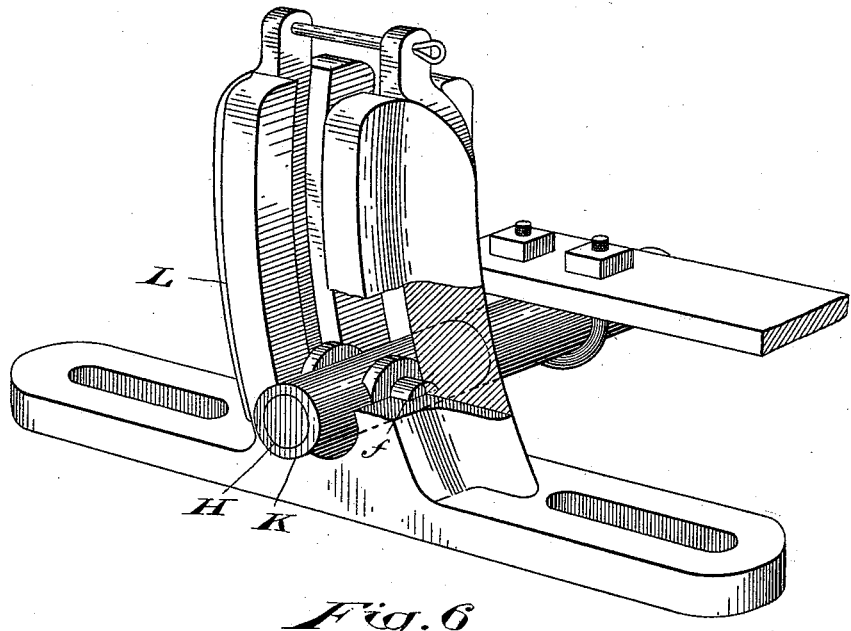
Fig. 6
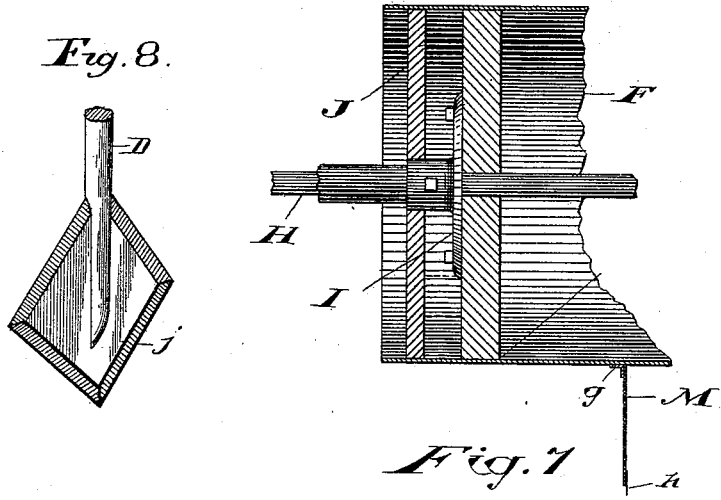
Fig. 8.
Fig. 7
Witnesses
J. Edw. Maybee
W. J. McMillan
Inventor
Geo. W. Morris
by Donald C. Ridout & Co.
Attys

UNITED STATES PATENT OFFICE.

GEORGE W. MORRIS, OF BRANTFORD, CANADA, ASSIGNOR TO ALICE MORRIS, OF SAME PLACE.

BAND-CUTTER AND AUTOMATIC FEEDER FOR THRASHING-MACHINES.

SPECIFICATION forming part of Letters Patent No. 495,101, dated April 11, 1893.

Application filed March 31, 1892. Serial No. 427,260. (No model.)

*To all whom it may concern:*

Be it known that I, GEORGE WILLIAM MORRIS, of the city of Brantford, in the county of Brant, in the Province of Ontario, Canada, have invented a certain new and Improved Band-Cutter and Automatic Feeder for Thrashing-Machines, of which the following is a specification.

The object of the invention is to provide simple and effective mechanism by which the sheaf bands are cut and the sheaves automatically fed into, distributed and packed upon the cylinder of the thrashing machine, and it consists essentially, of revolving disks provided with peculiarly formed cutting blades and located behind the cylinder over a traveling rake arranged to feed the sheaves onto the top of the cylinder, reciprocating spreading tines being arranged to act upon the sheaves as they drop upon the cylinder and a flexible packing plate being provided to elastically hold the straw upon the cylinder, the whole being constructed in detail substantially as hereinafter more particularly explained, and then definitely claimed.

Figure 1:
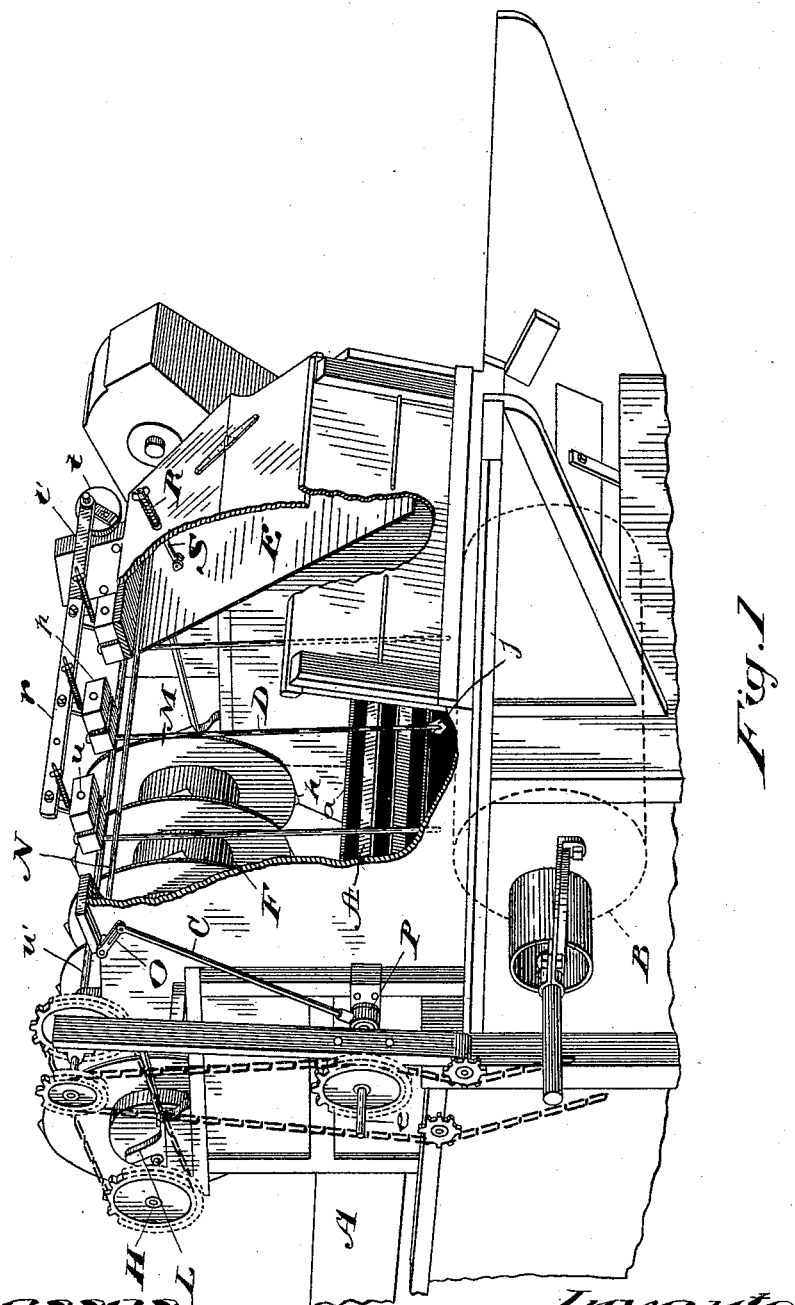
Figure 2:
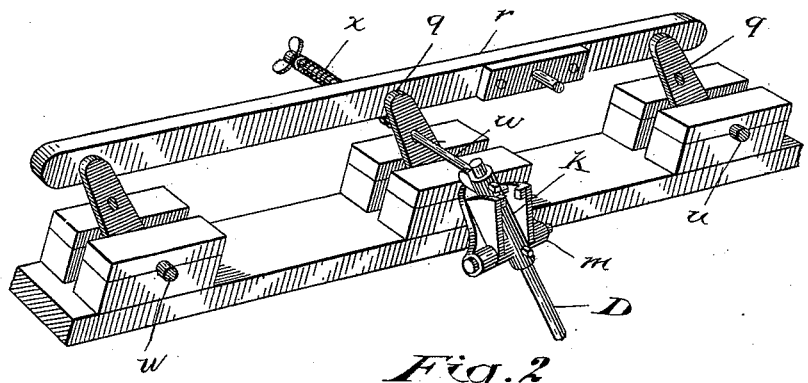
Figure 3:
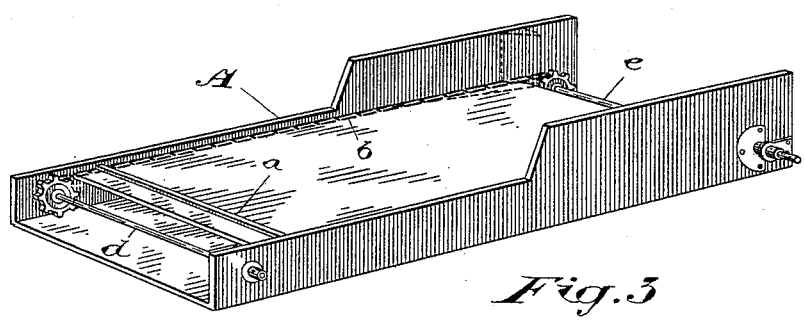
Figure 4:
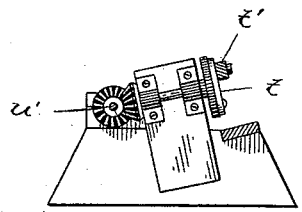
Figure 5:
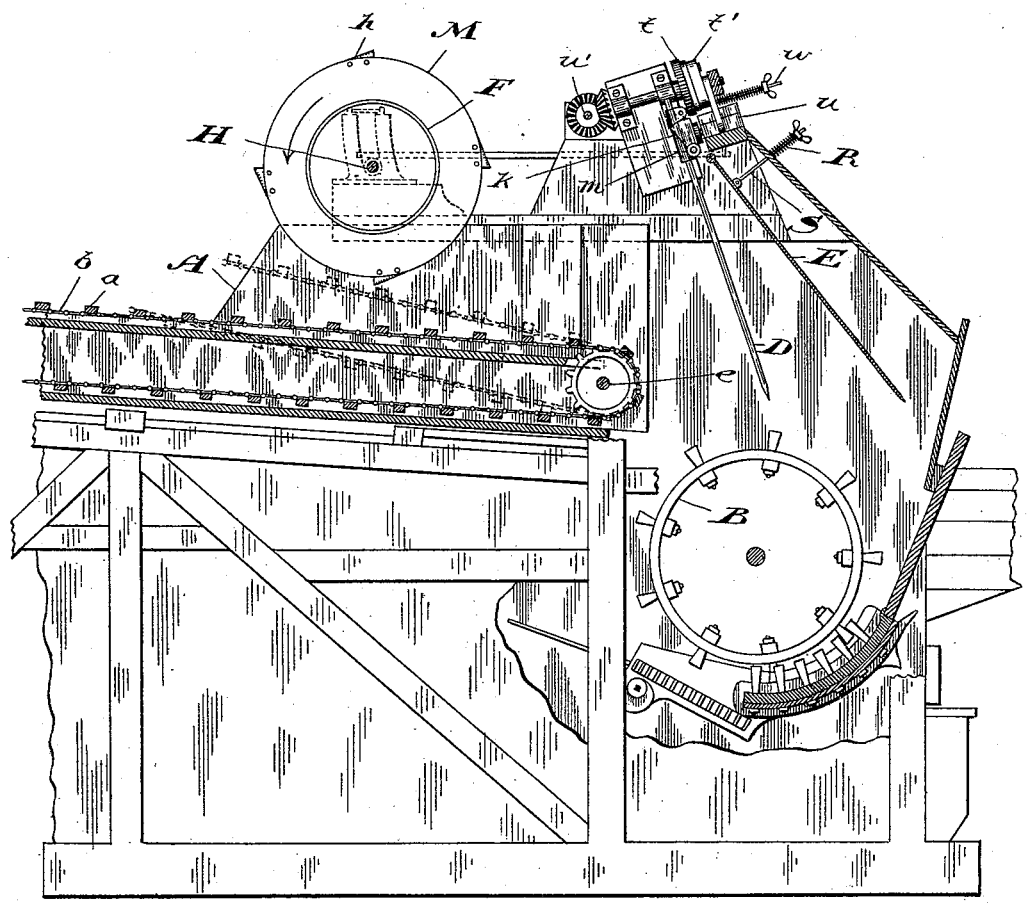

In the accompanying drawings: Figure 1, is a perspective view of my automatic feeder. Fig. 2, is a perspective view of the mechanism for actuating the spreading tines. Fig. 3, is a perspective detail of the grain carrying rake. Fig. 4, is a detail of the crank disk driving mechanism. Fig. 5, is a sectional elevation of the automatic feeder. Fig. 6, is a perspective detail of the bearing for band cutter. Fig. 7, is a sectional detail showing the formation of the cutter drum. Fig. 8 is a detail view of one of the tines.

In automatic feeders for thrashing machines, it is customary to feed from the front of the machine in such a manner that the grain shall be immediately drawn in by the cylinder and forced down against the concave so rapidly and harshly that the cylinder becomes so clogged that the operation of the machine is seriously interfered with. By the adoption of my improved arrangement, the straw is fed onto the top of the cylinder and operated upon by the spreading tines, in such a manner that the straw becomes separated before being acted upon by the cylinder and is so gently and elastically packed by the mechanism provided therefor, that a machine provided with my automatic feeder will work as smoothly and evenly as it would were it attended to by the hands of a skillful operator.

Before describing the parts in detail, I shall first preferably set out the principal elements in the machine and the manner in which the sheaves are acted upon. A, represents a traveling rake carried in a suitable frame located on top of the machine in such a manner that it will discharge the sheaves placed on the rake immediately over and onto the revolving cylinder B. I hinge or pivot the frame carrying the rake to the shaft *e* so that it may be lifted high enough (as shown in dotted lines) to permit access through the top of the machine into the inside. M, represents a series of disks arranged as hereinafter described and forming the band cutter which is located above the rake A, a short distance before the cylinder B, is reached. Immediately over the cylinder B, a series of tines D, are suspended. These tines have a reciprocating movement parallel with the axis of the cylinder by which the grain is distributed or spread over said cylinder. The tines are also hinged so that they will yield as the grain is fed in by the traveling rake A. Behind the tines D, I hinge a packing plate E, preferably composed of light sheet metal which is operated by mechanism so as to have a light swinging motion calculated to pack down the straw toward the cylinder. These constitute the leading elements of my device by which the thrashing machine is regularly and evenly fed, the straw properly distributed over the cylinder and fed therein by a yielding packer practically in the same way as though the machine was fed by the hands of a skilful operator.

On reference to Fig. 3, the detail of the construction of the rake will be understood. The rake proper consists of a series of slats, *a*, fixed at each end to a sprocket chain *b*, which is carried on sprocket wheels fixed to the shafts *d*, and *e*, suitably journaled in the frame A, of the rake. The back shaft *e*, is journaled in a box fixed to the frame of the machine and a sprocket wheel is fixed to this latter shaft so as to gear with some suitable portion of the machine in order that the necessary traveling motion may be imparted to the slats *a*. It will be observed that the frame A, of the rake has a bottom, which bottom collects everything that drops from the straw carried by the rake, leaving it where it can be swept out by the slats as they return after carrying the sheaf toward the thrashing cylinder. It will be observed that the sides of the rake A, are raised above the slats at the end where the sheaves are discharged onto the cylinder. These sides are so raised for the purpose of directing the sheaves toward the center of the machine and preventing them spreading toward the ends of the thrashing cylinder.

On reference to Fig. 7 the construction of the band cutter will be understood. A light sheet metal drum F, has its ends closed by wooden blocks G, through which blocks the shaft H, is centrally carried. On each end of the shaft H, is fitted a flange I, arranged to butt against the block G, to which it is bolted, the said flange being rigidly fastened to the shaft. The blocks G, are sunk sufficiently far in the drum F, to allow the flange I, to be within the drum, the outer end of the drum being closed by a plain wooden disk J, as shown in Fig. 7. The shaft H, is carried in a bearing box K, (see Fig. 6) which is vertically movable in the bracket L, and is carried on trunnion $f$, in such a manner that either end of the shaft H, may be raised independently of its other end. Around the drum F, I fit a series of light metal (preferably steel) disks M, which disks are loosely fitted onto the drum F, as indicated, and are held in position by a series of angle irons $g$, which are riveted one-half to the drum F, and the other half to the disk M, a sufficient number of angle irons being placed to secure the disks rigidly in position. Around the periphery of each disk M, I arrange a series of triangularly shaped cutters $h$, riveted to the disks, as indicated. Each cutter has a serrated edge, as shown in Fig. 5 set pointing in the direction opposite to that in which the disk revolves so as to act against and sever the binding cord without any tendency to pick up the bundle.

On reference to Fig. 2 the mechanism by which the tines D, are operated will be understood. These tines, one or all of which I should perhaps have mentioned before, have arrow-shaped ends $j$, which are serrated and sharpened and intended to act as cutters in the event of a sheaf being thrown into the thrashing receptacle crosswise without the cord being cut. The upper end of each tine passes through a socket $k$, hinged to a bracket $m$, fixed to a shaft $n$, suitably journaled in boxes $p$, attached to the frame. Each spindle $u$, has an arm $q$, which arms are all connected together by the bar $r$, which bar is connected by a pitman $t'$ to a crank, $t$, which is fixed to a shaft $u$, deriving motion by bevel gearing as shown from a shaft $u'$ connected at its other end to the shaft H in such a manner that when the machine is in operation, the shaft $u$, will be caused to revolve and through it the crank, $t$, which operates the bar, $r$, causing the arms $q$, to rock and consequently all the shafts $n$, carrying the brackets $m$, move so as to impart a reciprocating motion to the tines D. As each of the sockets $k$, is hinged on its bracket $m$, the tines are permitted to yield and accommodate themselves to the pressure of the sheaves being fed into the machine.

In order that the tines D, shall not yield too freely, I attach to each socket $k$, a rod $w$, which extends back through the arm $q$, and is provided with a spiral spring $x$, which spiral spring holds the tines toward the incoming grain, but permits them to yield if the pressure is unduly increased. As it may be desirable to sometimes increase the resistance I provide the rod $w$, with a nut by which the tension of the spring $x$, may be increased as desired.

On reference to Fig. 1 it will be observed that the packing plate E, is carried on a rod N, suitably journaled and provided with a crank O, connected by the rod C to an eccentric P, carried on the driving shaft $e$ of the rake A. Owing to this connection, the packing plate E, has a vertically reciprocating motion, which gently acts against the straw and packs it down toward the cylinder B, in very much the same manner as the hands of an operator would act.

It should be mentioned that with some kinds of grain the positive motion of the plate E, is not desirable. In such a case the crank O is disconnected from the connecting rod C, and the adjustable spring R is provided, which is fitted with a spindle S, as shown in Figs. 1 and 5, and which takes off as much of the weight of the plate E, as may be desired to leave the requisite downward pressure.

What I claim as my invention is—

1. A band cutter comprising a drum having cutters projecting therefrom, and an axle for said drum, in combination with a grooved bracket L, a bearing box K in which said axle is journaled and a trunnion $f$ attached to said box and adapted to work in the groove in said bracket, substantially as described.

2. A tine D provided with a cutter head $j$ and connected with a bracket $m$, in combination with means for giving said bracket a rocking movement, substantially as described.

3. A tine D fitted into a socket $k$ pivoted on a bracket $m$, in combination with a rod and spring designed to act against said pivoted socket $k$ and a nut for changing the tension of said spring, substantially as described.

4. A packing plate E, connected to the rod N, which is provided with a crank O, connected by a rod C, to the eccentric P, on the driving shaft $e$, substantially as described.

5. A packing plate E, connected to the rod N, in combination with the spindle S, and spiral spring R, substantially as described.

Toronto, March 3, 1892.

GEORGE W. MORRIS.

In presence of—
A. M. NEFF,
J. EDW. MAYBEE.